United States Patent
Einecke et al.

(10) Patent No.: US 9,137,943 B2
(45) Date of Patent: Sep. 22, 2015

(54) TRAINABLE AUTONOMOUS LAWN MOWER

(71) Applicant: HONDA RESEARCH INSTITUTE EUROPE GMBH, Offenbach/Main (DE)

(72) Inventors: Nils Einecke, Offenbach/Main (DE); Mathias Franzius, Offenbach/Main (DE); Heiko Wersing, Frankfurt (DE)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 69 days.

(21) Appl. No.: 13/951,504

(22) Filed: Jul. 26, 2013

(65) Prior Publication Data
US 2014/0032033 A1   Jan. 30, 2014

(30) Foreign Application Priority Data
Jul. 27, 2012 (EP) ..................................... 12178244

(51) Int. Cl.
*G05D 1/00* (2006.01)
*A01D 34/00* (2006.01)

(52) U.S. Cl.
CPC .................................. *A01D 34/008* (2013.01)

(58) Field of Classification Search
CPC ................. G06F 17/00; B25J 9/1697; G05B 2219/40201; G06K 9/2081; A01D 34/008
USPC .......... 701/24, 519; 700/245, 259; 901/46, 47
See application file for complete search history.

(56) References Cited

U.S. PATENT DOCUMENTS

| 6,611,738 | B2 | 8/2003 | Ruffner |
| 6,754,560 | B2 * | 6/2004 | Fujita et al. ................... 700/245 |
| 7,720,775 | B2 * | 5/2010 | Shimomura et al. ........... 706/45 |
| 8,639,644 | B1 * | 1/2014 | Hickman et al. ................ 706/14 |

(Continued)

FOREIGN PATENT DOCUMENTS

| EP | 2286653 A2 | 2/2011 |
| EP | 2340701 A2 | 7/2011 |

(Continued)

OTHER PUBLICATIONS

European Search Report dated Dec. 19, 2012 corresponding to European Patent Application No. 12178244.5.

(Continued)

*Primary Examiner* — Khoi Tran
*Assistant Examiner* — Jorge Peche
(74) *Attorney, Agent, or Firm* — Squire Patton Boggs (US) LLP

(57) ABSTRACT

The present invention proposes a profound user-mower interaction, which enables the user to teach a robotic lawn mower for improving its visual obstacle detection. The main idea of the invention is that the user can show some typical obstacles from his garden to the mower. This will increases the performance of the visual obstacle detection. In the simplest scenario the user just places the mower in front of an obstacle, and activates the learning mechanism of the classification means (module) of the mower. The increasing use of smart devices such as smart phones or tablets enables also more elaborated learning. For example, the mower can send the input image to the smart device, and the user can provide a detailed annotation of the image. This will drastically improve the learning, because the mower is provided with ground truth information.

21 Claims, 6 Drawing Sheets

(56) References Cited

U.S. PATENT DOCUMENTS

| | | | |
|---|---|---|---|
| 2002/0158599 A1* | 10/2002 | Fujita et al. | 318/568.11 |
| 2002/0191002 A1* | 12/2002 | Friedrich et al. | 345/632 |
| 2004/0215463 A1* | 10/2004 | Aoyama et al. | 704/270 |
| 2006/0126918 A1* | 6/2006 | Oohashi et al. | 382/153 |
| 2007/0047809 A1* | 3/2007 | Sasaki | 382/170 |
| 2007/0127774 A1* | 6/2007 | Zhang et al. | 382/103 |
| 2008/0269973 A1* | 10/2008 | Kuroda | 701/26 |
| 2009/0016599 A1* | 1/2009 | Eaton et al. | 382/159 |
| 2009/0179895 A1* | 7/2009 | Zhu et al. | 345/424 |
| 2010/0061701 A1* | 3/2010 | Iwane | 386/95 |
| 2010/0168913 A1* | 7/2010 | Lee et al. | 700/246 |
| 2010/0324731 A1 | 12/2010 | Letsky | |
| 2012/0044093 A1* | 2/2012 | Pala | 340/963 |
| 2012/0314030 A1* | 12/2012 | Datta et al. | 348/44 |

FOREIGN PATENT DOCUMENTS

| | | | |
|---|---|---|---|
| EP | 2342964 A1 * | 7/2011 | |
| EP | 2428107 A1 | 3/2012 | |
| WO | WO 2007/091967 A1 | 8/2007 | |
| WO | WO 2010/077198 A1 | 7/2010 | |
| WO | WO 2011/002512 A1 | 1/2011 | |

OTHER PUBLICATIONS

Alexander Schepelmann, "Identification & Segmentation of Lawn Grass Based on Color & Visual Texture Classifiers," Master Thesis, Department of Mechanical Engineering, Case Western Reserve University, Aug. 2010, pp. 1-77.

* cited by examiner

TRAINABLE AUTONOMOUS LAWN MOWER

BACKGROUND

1. Field

The present invention is directed to a robotic lawn mower and a training method thereof. The robotic lawn mower can detect and identify obstacles and can autonomously avoid the detected obstacles while operating. In particular, the robotic lawn mower is able to be trained, in order to learn new obstacles for improving its visual obstacle detection. A profound user-mower interaction enables a user to customize the robotic lawn mower.

2. Description of the Related Art

Autonomous or robotic lawn mowers are an increasing market. Such mowers autonomously mow the lawn e.g. in a random fashion cutting only small pieces of grass in every run ("mulching"). The small pieces fall into the sod, thereby fertilizing the lawn. This principle is called mulching. Usually a mowing area is delimited by an electric border wire, which emits a weak electromagnetic field. This electromagnetic field is detected and used by the mower to stay within the allowed mowing area or to find a base station for recharging. To avoid obstacles (either static or dynamic), which are not indicated by a border wire, autonomous mowers typically use bump and sonar sensors.

Unfortunately, bump and sonar sensors work reliably only for large obstacles. Flat obstacles like smart phones or hoses are not recognized, and may be damaged when the mower drives over them. This drawback can potentially be removed by attaching a camera on the mower and recognizing obstacles by means of image processing. One typical solution in this respect is to provide a classifier module of the mower with samples of grass and obstacles so that the classifier module is able to distinguish between drivable grass and non-drivable obstacles.

The problem of such classifying approaches is that it is difficult to foresee all potential kinds of obstacles that may be encountered during the operation of the mower. Every kind of obstacle that has not been provided to the classifier module beforehand may be later miss-evaluated during operation.

EP 2 286 653 describes an autonomous lawn mower that combines camera grass recognition with the output of a grass sensor. The grass sensor is used to bootstrap and update a classifier that classifies pixels either as grass or non-grass based on their pixel values (e.g. color). Furthermore, a computer implementation for controlling a mower with a camera is described. The classifier of the mower cannot in any way be influenced by a user. The mower can also not recognize different classes of obstacles, and consequently cannot trigger different behaviors of the mower regarding different obstacles.

WO 2010/077198 describes an autonomous robotic lawn mower and a method for establishing a wireless communication link between the lawn mower and a user. A border-wire-based robotic mower is disclosed and is able to communicate with a cellular network structure. The mower can inform the user when the mower detects a "situation". The user can send back an acknowledgement signal or a message. However, no information for clarification of an uncertain detection result or for improving a classifier installed in the mower software is mentioned. The user is not able to improve the classifier, and also different obstacles cannot trigger different behaviors of the mower.

U.S. Pat. No. 6,611,738 B2 describes a general purpose mobile device, whose navigation is based on GPS. A movement teach-in is disclosed based on the GPS data, where a teach-in is a well-known technique in the field of robotics for teaching a robot to mimic a certain sequence of motor commands or motor positions by moving a robot manually or by means of a remote control. The user can give additional information about the working area, like the position of a newly planted tree. However, training and improving of the mower's visual obstacle detection by the user is not possible.

US 2010/0324731 A1 describes a method for establishing a desired area of confinement for an autonomous robot, and an autonomous robot implementing a control system for executing the same. An already known method of movement teach-in for acquiring a user-defined perimeter is described. Further, an interaction between a user and the mower via a smart phone (or similar devices) is disclosed. First, a map generated by means of perimeter information can be displayed on the smart phone. Second, the mower may be remotely controlled via the smart phone. Third, the base station may act as a communication gateway between smart phone and mower. However, interactions concerning the visual recognition of the mower are not anticipated. In particular, the smart device cannot display the visual input of the mower, so that the user cannot give any input for updating a classifier.

"Identification & Segmentation of Lawn Grass Based on Color and Visual Texture Classifiers", Master Thesis, Alexander Schepelmann, describes a grass recognition system for an autonomous lawn mower (CWRU cutter, Case Western Reserve University). The grass detection is based on color and texture cues. The approach employs classifiers, which are trained on some sample images. This approach includes a typical learning phase for training a classifier. However, user feedback to adapt the classifier or any attempts to identify different classes of obstacles is not envisaged.

WO 2011/002512 describes visual grass recognition based on image statistics. One idea is that the statistics in a current camera image are compared to the statistics of grass that were recorded in advance. This is a typical example of a predefined detection, which cannot solve the problems addressed by the present invention, because each garden has its own individual properties.

SUMMARY

The target of this invention is to improve the state-of-the-art in view of the above-described drawbacks. A particular aim of the present invention is to develop an autonomous lawn mower that is able to adapt its visual obstacle recognition based on user input.

There are two aspects of this invention which assist in achieving the above targets. First, the user can adapt a pre-trained classifier module in the mower, which is used for identifying obstacles on the lawn. Second, the user can separate obstacles into different classes, and can assign different behaviors of the autonomous lawn mower to these classes.

For using a robust classifier module in an autonomous lawn mower, the classifier module is trained with types of obstacles that may be encountered during operation at a specific environment (e.g. garden). Unfortunately, it is hard to foresee all possible obstacles that may be encountered in the plurality of different gardens, and also the capabilities of current classifiers modules are limited to a certain amount of information. Hence, according to the invention it is foreseen to have a basic classifier module that is provided at delivery of the mower, and which already covers a common set of obstacles that is likely to be encountered in many different gardens. This basic classifier module can then be adapted and edited ("customized") by the user to the needs of a specific environment (e.g.

garden). By doing so the problem of foreseeing all possible obstacles is strongly reduced. Furthermore, the basic set of obstacles plus the user-defined obstacle set is in total still smaller than a general obstacle set, and thus can be handled well by state-of-the-art classifier modules.

Since the thus customized classifier module of the present invention has to remember only a small set of obstacles that is specific for a certain garden, it is possible to provide more detailed obstacle recognition. Instead of detecting objects only as obstacles or grass, it is possible to distinguish different objects as different obstacles. This enables the user to put different obstacles into different classes. Each class of obstacles can then e.g. trigger a certain behavior of the lawn mower. For example, the user might want daisy flowers to be spared by the mower, but dandelions to be cut by the mower. Another case could be that the user wants to be informed, if the mower sees an unknown person.

Another advantageous aspect of the user feedback is to improve the obstacle detection of the mower in cases where the classifier module cannot make a reliable decision. In case the mower encounters an object, which the classifier module cannot unambiguously identify, the mower can e.g. send a sample image to the user, who in response informs the mower, whether the object is an obstacle, can be cut or should be spared.

The present invention and the above-mentioned advantages are realized by a robotic lawn mower and a corresponding training method according to the independent claims of this invention. The dependent claims further develop the core idea of the invention, and realize further advantages.

In particular, the present invention is directed to a robotic lawn mower comprising at least one camera for obtaining an input image, a memory for storing information about obstacles, a classifier module of a computing unit connected to the memory, for segmenting obstacles within the input image supplied from the camera and identifying segmented obstacles based on the information stored in the memory, and a control unit for controlling a movement of the mower based on the identification of at least one obstacle, wherein the classifier module is provided with an interface in order to edit the information stored in the memory upon acceptance of user input.

By editing the information in the memory, information about new obstacles can for example be added. New obstacles are obstacles, for which no corresponding information is yet stored in the memory. Information about obstacles in the memory can also be changed or deleted. The classifier module of the robotic lawn mower can thus be fine-tuned by the user through training the mower in the garden.

Due to the possible customization through user input, the classifier module has to remember only a small set of obstacles, which are specifically selected for the user's garden, and thus more detailed obstacle recognition is possible. Further, instead of simply detecting objects in a garden as either obstacles or grass, it is possible to identify, and thus to distinguish and classify, different obstacles. Thus, the user is also able to customize the behavior of the robotic mower depending on the type or class of one or more identified obstacles, or on specific characteristics like shape, size or color of an identified obstacle, whereby a more flexible usage of the mower is achieved.

Preferably, the classifier module is configured to edit the information stored in the memory according to segmented obstacles within the input image. For example, when a segmented obstacle within the input image cannot be identified by the classifier module based on the information stored in the memory, the user can teach the classifier module the unknown obstacle. In the simplest case the user inputs a confirmation that the unknown segmented obstacle is a valid obstacle that should be learned. In this case the interface can e.g. be a single confirmation button on the mower. In this way the classifier module can be customized.

Preferably, the robotic lawn mower is adapted to be selectively in a training mode, wherein in the training mode the classifier module is configured to automatically start editing the information stored in the memory, if an obstacle is positioned in the field of view of the at least one camera. The user can give input to enter the training mode. For example, the user can press a training mode button on the mower, or can send a message to the mower via a wireless communication channel that triggers the training mode. By means of the training mode the user can edit the information in the memory of the mower in a simple and fast manner.

Preferably, the classifier module is configured to estimate the position of the obstacle in the field of view of the camera by using a segmentation algorithm that separates foreground pixels from background pixels. The same segmentation algorithm can also be used during the normal mowing operation for identifying segmented obstacles. Known state of the art segmentation algorithms can be employed.

Preferably, the robotic lawn mower is provided with mowing blades and is configured to drive forward with its mowing blades switched off, until the mower hits the obstacle, in order to estimate the position of the obstacle, or until the obstacle is beneath the mower, in order to estimate the maximal height of the obstacle. The control unit of the mower is adapted to control the above behavior, and can further calculate the position and/or height of one or more detected obstacles. Thus, a more accurate definition of the obstacles can be obtained and stored as information in the memory. Further, classification of obstacles is possible.

Preferably, the robotic lawn mower is configured to send a message containing a snapshot image taken by the at least one camera to a remote smart device preferably using a wireless channel, and receive information about an annotated snapshot image from the smart device as user input. The snapshot image is a still image obtained from the input image of the at least one camera. The user can annotate the image on the remote smart device, in order to provide information about an obstacle. The classifier module of the mower can then analyze and interpret the annotation it receives from the user, and can learn and classify the obstacle in the snapshot image. For learning the obstacle, the classifier module stores information about the segmented obstacle in the memory. Obstacle recognition by the classifier module can in this way be easily customized and fine-tuned, also during the normal operation of the mower.

Preferably, the robotic lawn mower is configured to send the message to the remote smart device, when the classifier module has segmented an obstacle within the input image, which it cannot identify, or when a confidence value of the obstacle identification is below a given threshold. In this case the message can request a user input via the remote smart device, e.g. a confirmation that a specific action is to be taken by the mower or a simple yes/no decision for determining whether the segmented object is indeed an obstacle that is to be learned. In this way both the obstacle identification and the behavior of the mower can be improved and customized.

Preferably, the robotic lawn mower is configured to receive a user notification as user input, and to determine from the user notification, whether the snapshot image contains an obstacle or not. That means the user notifies the mower, whether the snapshot contains an obstacle or not. The mower can in this way learn new obstacles during its normal operation, and can immediately adapt its mowing behavior to the newly learned obstacles.

Preferably, the robotic lawn mower is configured to determine from the fact that a user has added a contour around an object in the snapshot image that said object is an obstacle. The user can e.g. draw the contour around the obstacle on his remote smart device, and can then send this information back to the mower. The mower can interpret the contour as an indication of an obstacle, can segment the obstacle precisely based on the contour, and can store the obtained information about the obstacle in the memory.

Preferably, the robotic lawn mower is configured to obtain additional information about an obstacle from at least one tag received together with the user notification. The tags with additional information can be provided by the user. The tags can be saved in addition to the other obstacle information in the memory. The tags are helpful information for identifying and/or classifying obstacles.

Preferably, the at least one tag is an obstacle class. Thus, the classification of obstacles is simplified and user customized. Obstacle classes can e.g. be used to trigger a common behavior of the mower.

Preferably, the control unit is configured to control different behaviors of the mower according to different received obstacle tags. Thus, the user can assign different behaviors of the mower according to his preference. In case the mower detects a known obstacle, a used defined behavior can be carried out.

Preferably, the different behaviors include evading the obstacle, driving over the obstacle, taking a snapshot of the obstacle, and signaling an acoustic alarm.

Preferably, the robotic lawn mower is configured to communicate with the remote smart device via a data server and a client software.

Preferably, the data server is located in a charging station of the mower.

Preferably, the client software is software installed on the remote smart device.

Preferably, the data server is adapted to buffer messages in a queue for performing an asynchronous communication between the mower and the smart device. That means, the messages are collected and stored in the data server, so that the user can answer all messages at once at a later point in time. Thus, the usage of the mower becomes more convenient for the user, since the user is not annoyed by frequently incoming messages.

Preferably, the robotic lawn mower is configured to receive a control instruction from the remote smart device. Thus, the mower, i.e. its behavior, can be controlled remotely via the remote smart device of the user.

Preferably, the robotic lawn mower is configured to send a live stream of the input image of the at least one camera to the remote smart device. The user can thereby customize the mower in real-time.

Preferably, the remote smart device is a remote telecommunications smart device like a PDA, a smart phone or a tablet, or another remote smart device, preferably capable of communicating in a wireless manner, like a PC, an intelligent house control unit or an external control unit for the mower.

The present invention is further directed to a method for training a robotic lawn mower comprising a classifier module of a computing unit for segmenting obstacles within an input image supplied from at least one camera and identifying segmented obstacles based on the information stored in a memory (10), wherein the method for training comprises providing user input via an interface of the classifier module in order to edit the information stored in the memory.

Providing user input can, for example, be carried out by setting the mower into a training mode (e.g. by pressing a training mode button) and positioning the mower in front of an obstacle (so that the obstacle is in the field of view of a camera of the mower).

Alternatively, user input can be provided via a remote smart device, preferably through a wireless communication interface. The user input can be provided in response to a request or a snapshot image from the mower, or initiatively.

BRIEF DESCRIPTION OF THE DRAWINGS

In the following, the present invention will be explained in detail with reference to the attached drawings.

DETAILED DESCRIPTION

Figure 1:
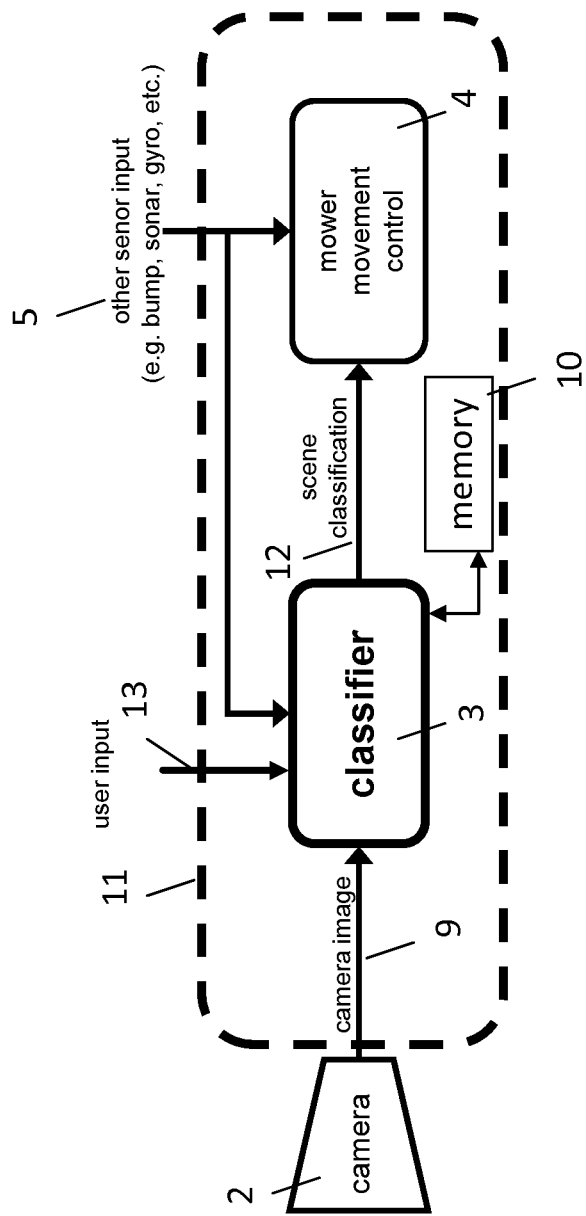
FIG. 1 schematically illustrates a robotic lawn mower of the present invention.

The figures show an autonomous or robotic lawn mower 1 capable of visual obstacle detection and thus having the capacity to detect a wide range of different obstacles 3, which are otherwise hard to detect with the typically used sensors, e.g. bump sensors and/or sonar sensors. For example, flat mobile phones or hoses are prone to be driven over by the mower, thereby damaging these objects as well as the mower blades.

A common way for visual obstacle detection is to use a learning or classifier module 3 (see FIG. 1) that is implemented in a computing unit 11 of the lawn mower. This classifier module 3 is trained with pre-set information prior to the delivery of the mower to the user, and is thus able to detect obstacles 6 that appear in the visual input images of at least one camera 2 of the mower 1, which camera 2 supplies an output signal to the computing unit of the lawn mower. The pre-set information about the obstacles 6 is stored in a memory 10 of the mower 1. The memory 10 can also be part of the classifier module 3, and can e.g. be at least one solid state memory, a hard drive or similar storage device.

The classifier module 3 is functionally connected to the memory 10, in order to identify obstacles 6 based on the stored information and on the output signal 9 of the at least one camera 2. It can further send a scene classification signal 12 to a (movement) control unit 4 of the mower 1, which then uses the information about the scene and the obstacle 6 for a certain action, e.g. to avoid an obstacle 6.

In order to make the classifier module 3 to work in a variety of gardens, it is necessary to have initially a very general training with a general set of obstacles 6 that might be encountered during the operation of the mower 1. This, however, is very difficult, as it is neigh impossible to foresee all eventualities and all possible obstacles.

Hence, this invention proposes that the user of the mower 1 can train the classifier module 3 to the specific properties of a garden, i.e. the user can customize and improve the obstacle identification capabilities of the mower 1. To this end the classifier module 3 of the mower 1 of the present invention is provided with an interface, in order to edit the information about obstacles stored in the memory upon acceptance of user input. Preferably, upon acceptance of the user input, the information in the memory 10 is edited by the classifier module 3 according to segmented obstacles 6 within the input image 9, which cannot be identified by the classifier module 3. The computing unit 11 of the mower can, for example, be selectively set by the user into a training mode, in which the classifier module 3 can learn new obstacles 6 and store additional information about the new obstacles 6 for later use in its memory 10.

FIG. 1 shows a schematic illustration of the mower 1 of the present invention. The mower 1 has at least one camera 2, which obtains a camera image (input image) 9. The mower 1 can also be equipped with more than one camera 2, and objects can be detected either from multiple input images 9, or the input images 9 of the cameras 2 can be switched. The camera 2 can be any kind of optical camera (e.g. visible light camera, infrared camera or the like). The mower 1 can also be equipped with different kinds of cameras 2. Preferably, there is at least one camera 2 that is directed in the driving direction of the mower 1, i.e. a front camera. However, side or back cameras 2 are also useful.

The at least one camera 2 feeds an output signal (i.e. a generated input image 9) into a classifier module 3 of the mower 1. The classifier module may be implemented into the software of the mower 1. The classifier module 3 can store information about obstacles in the memory 10, and can segment, detect and identify obstacles 6 from the input image 9 of the at least one camera 2. For the segmentation of obstacles 6, known segmentation algorithms can be used, e.g. algorithms separating foreground pixels from background pixels. The segmented obstacles can be identified based on the stored information (which can e.g. be shape, dimensions, size, volume, contours, color, brightness or the like). The classifier module 3 can further output a scene classification signal 12 to a control unit 4. The classification signal 12 can indicate identified obstacles 6, which can also be classified. To this end, identified obstacles 6 can be put into classes (e.g. plants, people, objects, animals etc.) either automatically based on the information stored in the memory 10, or by a specific user input. The classifier module 3 can also take into account the input of one or more sensors 5 (like a bump, sonar or gyro sensor) for a more accurate identification and classification of obstacles 6. Finally, the classifier module has an interface 13 for receiving the user input, in order to edit the information in the memory 10.

The control unit 4 is able to control the behavior, in particular the movement, of the mower 1. That means it can at least cause the mower 1 to drive (forwards and backwards) and steer (turn left or right). Further, it may cause activation or deactivation of mowing blades of the mower 1, may vary the movement speed of the mower 1, or change other mower 1 or even camera 2 parameters (e.g. exposure, aperture, shutter speed, hue, zoom etc.). The control unit 4 can be realized by a microprocessor or a similar device. The control unit 4 can be further connected to one or more sensors 5, like bump sensor, sonar sensor, gyro sensor or the like. The control unit 4 can take into account all the information it receives (i.e. the input signals from the one or more sensors 5, and the output signal 12 from the classifier module 3), and can control the operation of the mower 1 based or in accordance with the received information. The behavior of the mower 1 can thus be controlled depending on an identified obstacle 6 or a class of obstacles 6.

Figure 2:
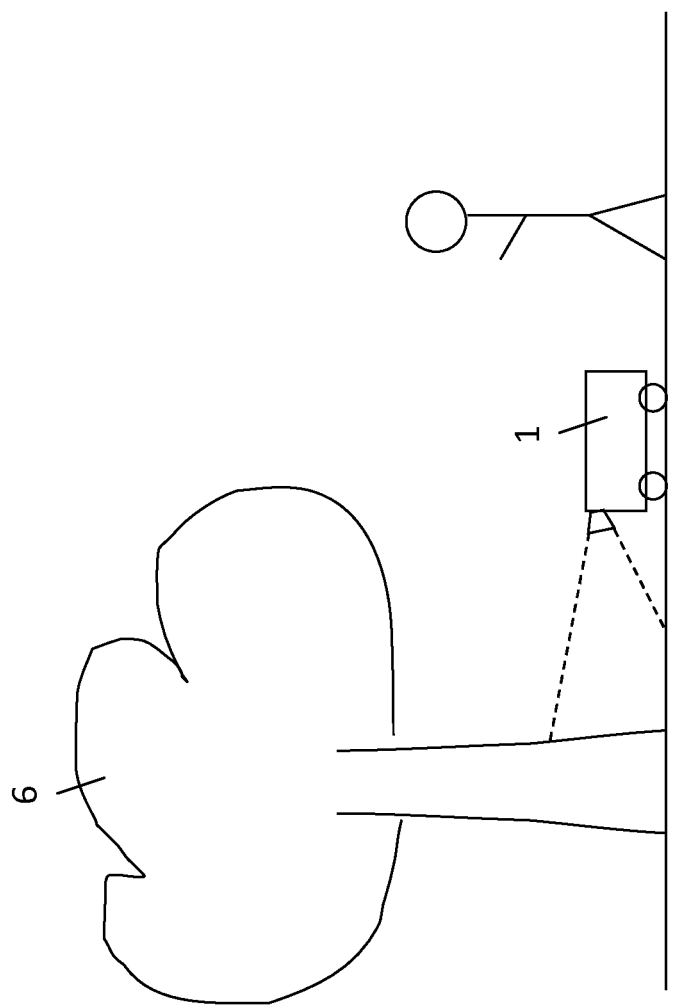
FIG. 2 shows a basic training procedure of the robotic lawn mower of the present invention.

The most basic idea of the present invention (shown in FIG. 2) in respect to editing the information in the memory 10 is that the user sets a training mode of the mower 1, e.g. by pressing a training mode button or sending a training mode command from a remote smart device. Then the user positions an obstacle 6 that is to be newly learned in front of the mower 1, in particular in the field of view of at least one of the cameras 2 (or alternatively positions the mower 1 in front of the obstacle 6, in case the obstacle is immobile like a flower bed or a tree). In the training mode the classifier module 3 can automatically trigger a learning mechanism, e.g. if an obstacle 6 is positioned in the field of view of the camera 2, in which it starts editing the information in the memory. In this scenario the classifier module 3 tries to segment the obstacle 6 within the input image 9, and then uses this segmentation to learn possibly all parameters describing the new obstacle 6. This information about the newly learned obstacle 6 is then stored in the memory 10. Thus, the information in the memory is edited.

Figure 3:
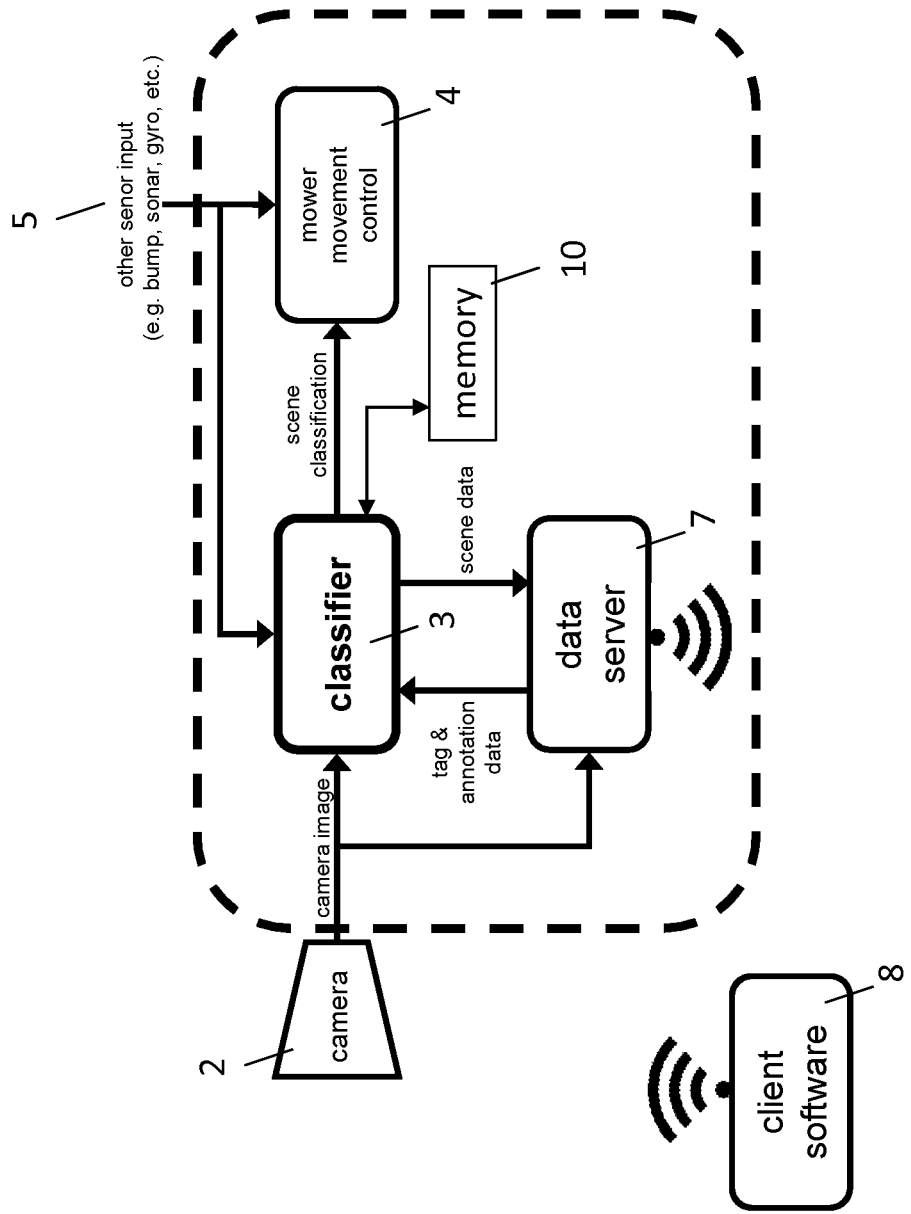
FIG. 3 schematically illustrates a robotic lawn mower of the present invention.
Figure 4:
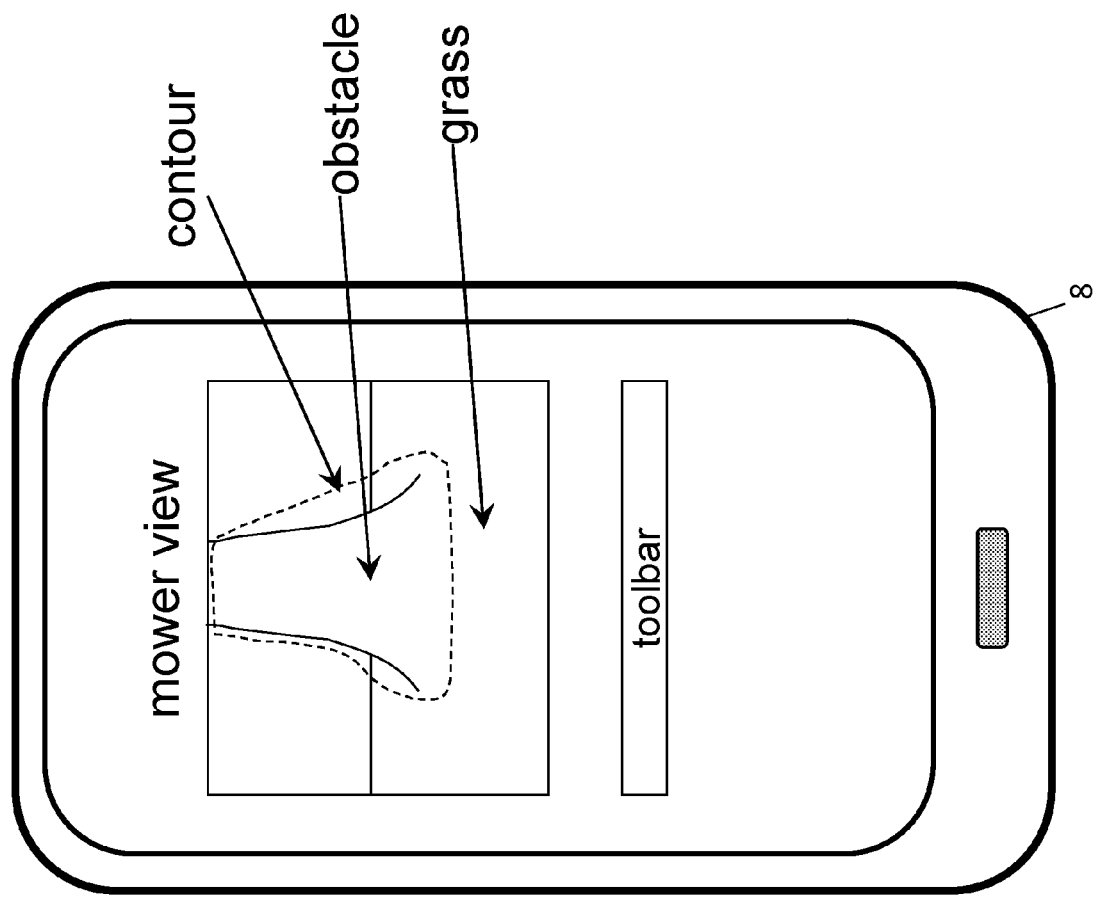
FIG. 4 shows a smart device for communicating with a robotic lawn mower of the present invention.
Figure 5:
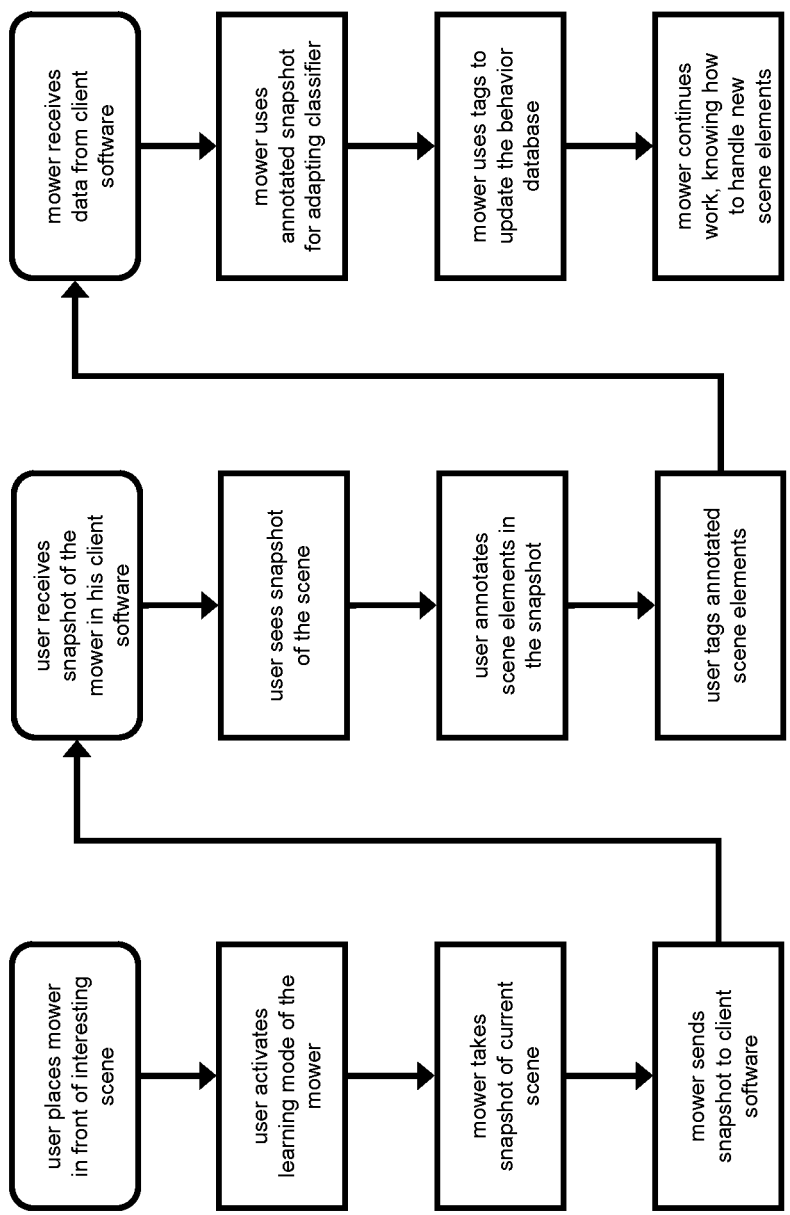
FIG. 5 is a flow diagram showing a training procedure of the robotic lawn mower of the present invention.

Although the basic idea of the present invention helps to improve the classification performance of the classifier module 3, the adaptation works even better, if the user gives more precise information to the classifier module 3, in particular of what he considers to be an obstacle 6. In this more advanced case (as depicted in FIGS. 3 to 5), the mower 1 can send an input image 9 (or a snapshot or scene data taken from the input image 9) from the at least one camera 2 to a data sever 7 that can further connect to a client software running on a remote smart device 8 (e.g. a remote smart telecommunications device like a smart phone, PDA or tablet, or a PC or other processing unit) of the user. The user can provide a precise segmentation of the obstacle 6 as user input to the mower 1. For example, the user can draw a contour (see FIG. 4) around the obstacle 6 of interest in the image that has been sent by the mower 1. This added contour can then be sent back from the remote smart device 8 to the data sever 7 of the mower 1, which receives and provides this information further to the classifier module 3. Since the classifier module 3 of the mower 1 now has precise information on which pixels of the snapshot image show the obstacle 6 to be learned, the learning procedure is much more effective and faster when compared to the case where the classification module 3 has to estimate on its own where exactly the obstacle 6 is located within the input image of the camera 2.

In another extension of the idea of the present invention the user can provide, in addition or alternatively to the contour provided in the snapshot image, more information about the obstacle 6. This further information can e.g. be provided in the form of tags (see FIG. 5). For example, the obstacle 6 could be assigned via a tag to a class like "nice flower" or "bad flower". The mower 1 is adapted to receive the tag set by the user, to store them in the memory 10 in relation to the obstacle information, and to interpret the tag, in order to obtain the class information. The class information can be used to train the classifier module 3, e.g. to distinguish different kinds of obstacles 6. The tags could also concern the size, shape or color or the like of an obstacle 6. Different kinds or characteristics of obstacles 6 can be used to trigger different behaviors of the mower 1, which are controlled by the control unit 4. As one example, the user could put dandelions in a "bad flower" class. When the mower 1 encounters such an obstacle 6, it will try to remove it by mowing it. Other obstacles 6 could be spared, so that only specific flowers or plants are mowed.

Figure 6:
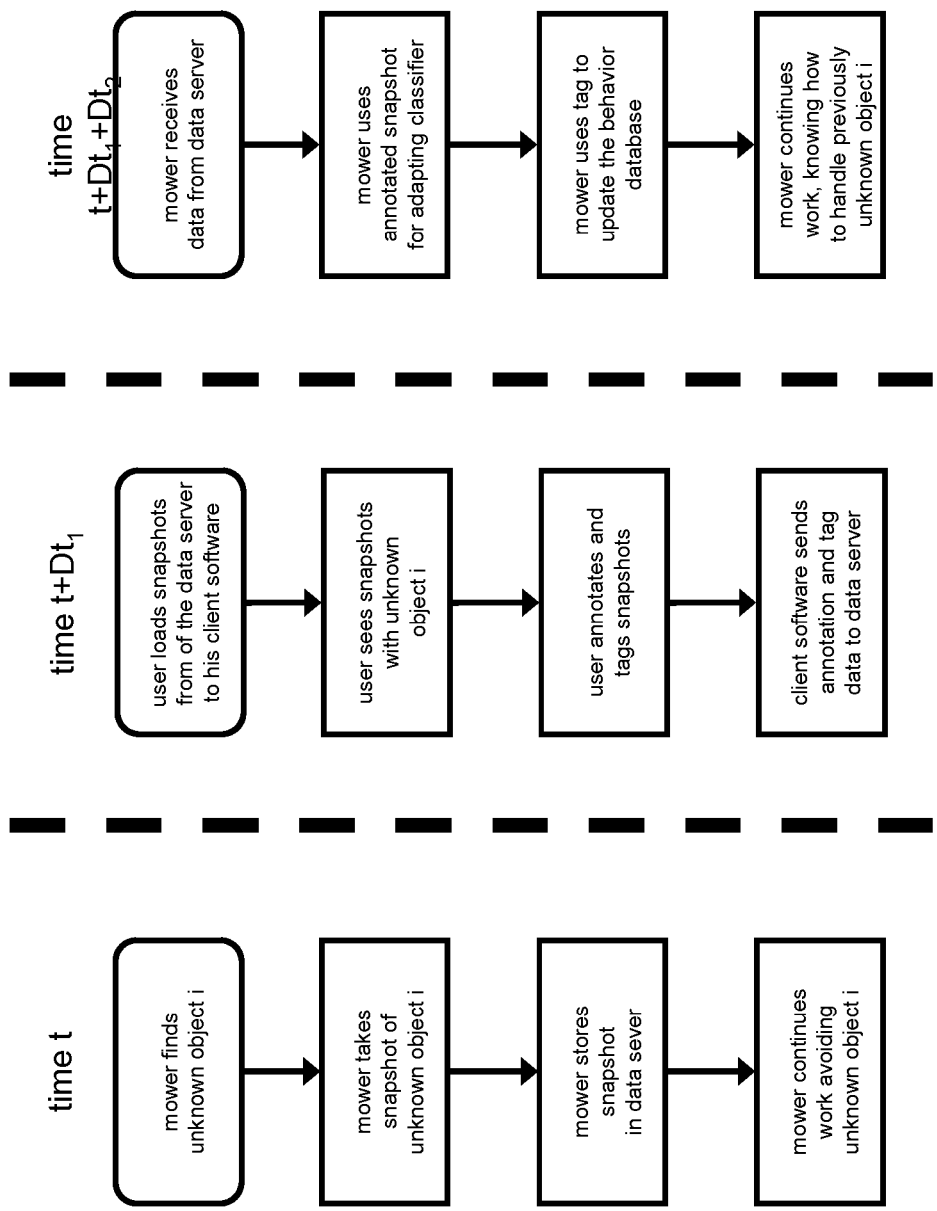
FIG. 6 is a flow diagram showing a training procedure of the robotic lawn mower of the present invention.

The user-mower interaction described above needs not necessarily be triggered by the user (see FIG. 6). When the mower 1 is operating in the user's garden, it might encounter (at a time t) an obstacle 6, which the classifier module 3 cannot identify, or for which a confidence value of obstacle identification is below a threshold value. The threshold value can be set and adjusted via user input. In other words the classifier module 3 is not sure what kind of obstacle it sees, or whether the object is an obstacle 6 at all. In such a situation the mower 1 can take and send an image or a snapshot of the current situation (i.e. the current input image 9 of the camera 2) to the remote smart device 8 of the user, who can then resolve the situation by telling the mower 1 what it has encountered.

In particular at a time shortly after the installation of the robotic mower 1, many unclear situations or unknown objects might be encountered, and the user might be annoyed by the frequent mower requests. Hence, a further idea of the present invention is to queue the mower requests in the data server 7. That means that (at a time t) when the mower 1 encounters an unknown object, the mower 1 sends the snapshot image to the data server 7. The mower continues working, while for the time being avoiding the unknown object. The snapshot is stored in the data server 7, When the user has time (e.g. at a time point t+$Dt_1$) he can check, whether the data server 7 has collected new notifications, and can download the data at once. The user can then process the data, e.g. by annotating or tagging the snapshot, and send the annotated or tagged snapshot back to the data sever 7 (or the mower 1).

At an even later time (t+$Dt_1$+$Dt_2$) the mower 1, in particular the classifier module 3, receives the annotations and tags from the data server 7 (or directly from the user), and the mower 1 can immediately use the information to adapt the classifier module 3 and the behavior of the mower 1. The mower 1 can continue to work on the formerly unknown objects, since it now knows how to handle them.

As long as the user has not specified otherwise, the mower 1 will regard the queued instances as obstacles 6, and will not drive over these. This enables a natural and asymmetric user-mower interaction, which neither hampers the mower 1 during its operation, nor does it annoy the users.

In summary, the core of this invention is a profound user-mower interaction, which enables the user to teach a robotic lawn mower 1 for improving its visual obstacle detection. The main idea of the invention is that the user can show some typical obstacles 6 from his garden to the mower 1. This will increases the performance of the visual obstacle detection. In the simplest scenario the user just places the mower 1 in front of an obstacle 6, and activates the learning mechanism of the classifier module 3 of the mower 1, which then edits information about obstacles 6 stored in a memory 10.

The use of remote smart devices 8, such as smart phones or tablets, enables a more elaborated learning. For example, the mower can send the input image 9 to the smart device 8, and the user can provide a detailed annotation of the image. This will drastically improve the learning, because the mower 1 is provided with ground truth information. A further extension to this idea is to tag objects, i.e. obstacles, and to relate certain activities of the mower 1 to the tag, like informing the user. On the other hand the mower 1 could also initiate an interaction by requesting annotation or tag information for unknown or hard to classify objects. The mower 1 then uses this annotation for adapting its classifier 3.

The invention claimed is:

1. A robotic lawn mower comprising:
   at least one camera for obtaining an input image;
   a memory for storing information about obstacles;
   a classifier module of a computing unit connected to the memory, for segmenting obstacles within the input image supplied from the camera and identifying segmented obstacles based on the information stored in the memory; and
   a control unit for controlling a movement of the mower based on the identification of at least one obstacle;
   wherein the classifier module is provided with an interface in order to edit the information stored in the memory upon acceptance of user input,
   wherein the robotic lawn mower is configured to send a message containing a snapshot image taken by the at least one camera to a remote smart device preferably using a wireless channel, and
   receive information about an annotated snapshot image from the smart device as user input.

2. The robotic lawn mower according to claim 1,
   wherein the classifier module is configured to edit the information stored in the memory according to segmented obstacles within the input image.

3. The robotic lawn mower according to claim 1, which is adapted to be selectively in a training mode,
   wherein in the training mode the classifier module is configured to automatically start editing the information stored in the memory, if an obstacle is positioned in the field of view of the camera.

4. The robotic lawn mower according to claim 3,
   which is provided with mowing blades and which is configured to drive forward with its mowing blades switched off
   until the mower hits the obstacle, in order to estimate the position of the obstacle, or
   until the obstacle is beneath the mower, in order to estimate the maximal height of the obstacle.

5. The robotic lawn mower according to claim 1,
   wherein the classifier module is configured to estimate the position of the obstacle in the field of view of the camera by using a segmentation algorithm that separates foreground pixels from background pixels.

6. The robotic lawn mower according to claim 5,
   which is provided with mowing blades and which is configured to drive forward with its mowing blades switched off
   until the mower hits the obstacle, in order to estimate the position of the obstacle, or
   until the obstacle is beneath the mower, in order to estimate the maximal height of the obstacle.

7. The robotic lawn mower according to claim 1,
   which is configured to send the message to the remote smart device,
   when the classifier module has segmented an obstacle within the input image, which it cannot identify, or
   when a confidence value of the obstacle identification is below a given threshold.

8. The robotic lawn mower according to claim 1,
   which is configured to receive a user notification as user input, and
   to determine from the user notification, whether the snapshot image contains an obstacle or not.

9. The robotic lawn mower according to claim 8,
   which is configured to obtain additional information about an obstacle from at least one tag received together with the user notification.

10. The robotic lawn mower according to claim 9,
    wherein the at least one tag is an obstacle class.

11. The robotic lawn mower according to claim 9,
    wherein the control unit is configured to control different behaviors of the mower according to different received obstacle tags.

12. The robotic lawn mower according to claim 11, wherein the different behaviors include evading an obstacle, driving over an obstacle, taking a snapshot image of an obstacle, and signaling an acoustic alarm.

13. The robotic lawn mower according to claim 1, which is configured to determine from the fact that a user has added a contour around an object in the snapshot image that said object is an obstacle.

14. The robotic lawn mower according to claim 1, which is configured to communicate with the remote smart device via a data server and a client software.

15. The robotic lawn mower according to claim 14, wherein the data sever is located in a charging station of the mower.

16. A robotic lawn mower according to claim 14, wherein the client software is software installed on the remote smart device.

17. A robotic lawn mower according to claim 14, wherein the data server is adapted to buffer messages in a queue for performing an asynchronous communication between the mower and the remote smart device.

18. A robotic lawn mower according to claim 1, which is configured to receive a control instruction from the remote smart device.

19. A robotic lawn mower according to claim 1, which is configured to send a live stream of the input image of the at least one camera to the remote smart device.

20. A robotic lawn mower according to claim 1, wherein the remote smart device is a PDA, a smart phone, a tablet, a PC, an intelligent house control unit or an external control unit for the mower.

21. A method for training a robotic lawn mower comprising a classifier module of a computing unit for segmenting obstacles within an input image supplied from at least one camera and identifying segmented obstacles based on the information stored in a memory,
wherein the method for training comprises:
providing user input via an interface of the classifier module in order to edit the information stored in the memory;
sending a message containing a snapshot image taken by the at least one camera to a remote smart device preferably using a wireless channel; and
receiving information about an annotated snapshot image from the smart device as user input.

\* \* \* \* \*